United States Patent [19]

Mitulla et al.

[11] Patent Number: 4,743,661

[45] Date of Patent: May 10, 1988

[54] POLY (PHENYLENE ETHERS) AND THEIR PREPARATION

[75] Inventors: Konrad Mitulla, Ludwigshafen; Juergen Hambrecht, Heidelberg; Helmut Tesch, Birkenheide; Burghard Schmitt, Worms; Hansjoachim Maeder, Battenberg, all of Fed. Rep. of Germany

[73] Assignee: BASF Aktiengesellschaft, Ludwigshafen, Fed. Rep. of Germany

[21] Appl. No.: 892,473

[22] Filed: Aug. 5, 1986

Related U.S. Application Data

[63] Continuation of Ser. No. 802,203, Nov. 25, 1985, abandoned.

[30] Foreign Application Priority Data

Dec. 4, 1984 [DE] Fed. Rep. of Germany ....... 3444099

[51] Int. Cl.$^4$ ............................................. C08F 283/08
[52] U.S. Cl. ................................... 525/396; 525/395; 525/391; 525/392
[58] Field of Search ................. 525/396, 395, 391, 392

[56] References Cited

U.S. PATENT DOCUMENTS

| | | | |
|---|---|---|---|
| 3,375,228 | 3/1968 | Holoch et al. | 525/390 |
| 3,392,146 | 7/1968 | Anderson et al. | 525/391 |
| 3,402,143 | 9/1968 | Hay | 525/397 |
| 3,753,946 | 8/1973 | Holub | 526/262 |
| 4,048,143 | 9/1977 | Hay | 525/397 |
| 4,315,086 | 2/1982 | Ueno et al. | 525/391 |
| 4,496,695 | 1/1985 | Sugio et al. | 525/391 |
| 4,528,346 | 7/1985 | Sugio et al. | 525/523 |
| 4,567,216 | 1/1986 | Qureshi et al. | 523/400 |

Primary Examiner—John Kight
Assistant Examiner—M. L. Moore
Attorney, Agent, or Firm—Keil & Weinkauf

[57] ABSTRACT

High molecular weight polyphenylene ethers are prepared from monohydric phenols by a conventional polycondensation, by a method in which the resulting polymers are reacted with an epoxide of the general formula (I)

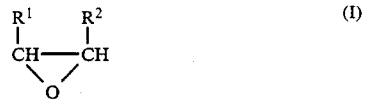

where $R^1$ and $R^2$ can be identical or different and are each alkyl, cycloalkyl, aryl, aryloxy, alkoxy or carboxyalkyl, each of which may contain a further epoxide group, or $C_3$-$C_{20}$-alkyl-substituted amino, or $R^1$ is hydrogen and $R^2$ is one of the above groups, or $R^1$ and $R^2$ form part of a cycloalkyl ring.

8 Claims, No Drawings

POLY (PHENYLENE ETHERS) AND THEIR PREPARATION

This application is a continuation of application Ser. No. 802,203, filed on Nov. 25, 1985, now abandoned.

The present invention relates to a process for the preparation of high molecular weight poly(phenylene ethers) from monohydric phenols, which possess alkyl substituents in the two ortho-positions but not in the para-position and may or may not possess alkyl substituents in the meta-position, by an oxidative coupling reaction with oxygen at from 10 to 50° C. in the presence of a catalyst complex of a copper salt and an organic amine, in the presence of from 1 to 20 parts by weight of a solvent per part by weight of the monomeric phenol, and in the presence or absence of an activator, and subsequent termination of the reaction and removal of the catalyst component by the addition of sufficient amounts of chelating and/or salt-forming agents and stabilization of the poly(phenylene ether) by chemical conversion at the hydroxyl groups.

Poly(phenylene ethers), also referred to as polyphenylene ethers for short, and processes for their preparation, are well known and have been described in many publications, for example in U.S. Pat. Nos. 3,306,874, 3,306,875, 3,642,699 and 3,661,848, whose disclosures are hereby incorporated by reference.

The processes most frequently used for the preparation of the polyphenylene ethers include the autocondensation of monohydric phenols by the action of oxygen in the presence of a catalyst. Preferably used catalysts are metal/amine complexes, in particular copper-/amine complexes, while aromatic hydrocarbons are preferably employed as solvents. The reaction is usually terminated by removing the catalyst from the reaction mixture. This is done by using aqueous solutions of inorganic or organic acids, as carried out in, for example, DE-A-11 05 372 by the countercurrent extraction method. Other compounds which are used are polyaminocarboxylic acids (cf. DE-A-23 64 319) or other chelating agents, such as nitrilotriacetic acid and its sodium salts or ethylenediaminetetraacetic acid and its sodium salts (cf. DE-A-25 32 477), the latter also in combination with quaternary ammonium salts (cf. U.S. Pat. No. 4,026,870). Removal of the catalyst with the aid of complexing agents from the group consisting of the bisguanides has also been described (cf. DE-A-24 60 325). Apart from termination of the oxidative autocondensation, the purpose of adding the complexing agent is also to remove the catalyst as completely as possible from the polyphenylene ether, since contamination of the polymer by residual metal leads to a deterioration in the overall property spectrum of the polymer.

In addition to removing the catalyst system, a further measure is as a rule necessary in order to stabilize the polyphenylene ether to prevent a reduction in the molecular weight. In this respect, DE-A-26 16 756 and 27 54 887 have proposed treating the polyphenylene ether-containing solution with reducing agents and dihydric phenols. This also converts the diphenoquinone formed as a by-product to the colorless bisphenol. However, we have found that this measure is not sufficient to stabilize polyphenylene ether molding materials to thermal and/or oxidative degradation. With regard to thermal and thermooxidative degradation, it is assumed that the terminal hydroxyl groups in the polyphenylene ethers constitute weak points and points of attack. Hence, the masking of these hydroxyl groups by chemical conversion has often been proposed in the patent literature [cf. U.S. Pat. Nos. 3,402,143 (1), 3,753,946 (2), 4,048,143 (3), 3,392,146 (4) and 3,375,228 (5)].

Publications (1), (2) and (3) describe the blocking of hydroxyl groups with acyl halides, anhydrides, sulfonyl chlorides and dialkyl sulfates with the addition of various bases or with conversion of the polyphenylene ether molecules to the corresponding phenolates. However, we have found that these reactions do not result in the blocking of all the OH groups, so that free OH groups are still detectable in the IR spectrum of the polyphenylene ethers. Publication (4) describes blocking with ketenes, which likewise gives unsatisfactory reactions. Patent (5) therefore proposes blocking polyphenylene ethers with anhydrides and ketenes at high temperatures, the hydroxyl groups of the side chains also being blocked in this procedure. However, the essential disadvantage of this method of blocking is that it leads to highly discolored polyphenylene ethers.

Furthermore, DE-A-32 38 930 discloses that the polyphenylene ethers obtained can be reacted with $\beta$-lactones or polymeric propiolactones, resulting in blocking of the polyphenylene ether. However, the disadvantage of this known method is that the $\beta$-lactones cannot be prepared in sufficiently large amounts and are very expensive.

It is an object of the present invention to provide completely blocked, high molecular weight polyphenylene ethers which have a pale intrinsic color and high stability to thermal and thermooxidative attack, and a process for their preparation which does not have the above disadvantages.

We have found that this object is achieved, in accordance with the invention, by the procedure described in claim 1 to 8.

High molecular weight polyphenylene ethers are the compounds obtained when a 2,6-dialkylphenol is subjected ot oxidative coupling to give a chain of alkyl-substituted benzene rings which are bonded in the paraposition by oxygen atoms forming ether bonds. The novel polymers have molecular weights of from 10,000 to 90,000, preferably from 20,000 to 80,000, determined by the method stated in *Macromolecular Synthesis* 1 (1978), page 83. High molecular weight polyphenylene ethers, also referred to as poly(phenylene oxides), have long been known from the literature (cf. for example U.S. Pat. No. 3,661,848, U.S. Pat. No. 3,219,625 or U.S. Pat. No. 3,378,505, so that a further description is unnecessary here.

The monohydric phenols which were used for the preparation of the high molecular weight polyphenylene ethers, and which possess alkyl substituents in the two ortho-positions but not in the para-position and may or may not possess alkyl substituents in the meta-position, are the conventional phenols such as 2,6-dimethylphenol, 2,6-diethylphenol, 2-methyl-6-ethylphenol, 2-methyl-6- propylphenol, 2,6-dibutylphenol, 2,3,6-trimethylphenol and mixture of these.

To carry out the polycondensation, oxygen is usually passed into the solution of the monomer at from 10 to 50° C., in the presence of a catalyst complex. The oxygen flow rate is essentially the same as that described in U.S. Pat. Nos. 3,306,874 and 3,306,875. In this preferred process, the catalyst consisting of a copper salt, preferably copper(I) bromide, an amine and from 0.01 to 5% by weight of 2,6-dimethylphenol is metered into the initially taken solution of the monomer.

The catalyst complex conventionally used for the polycondensation is a combination of an amine, eg. n-dibutylamine, diethylamine, picoline, quinoline, a pyridine base, triisopropylamine, dimethylisopropanolamine, triethanolamine, triisopropanolamine or diisopropanolamine, with a copper salt, such as copper(I) bromide, copper(I) chloride, copper(I) iodide, copper(II) acetate, copper(II) propionate, copper(II) acetoacetate or copper(II) acetylacetonate. The amine is preferably used in an amount of from 2.0 to 25.0 moles per 100 moles of the monomer, although the concentration of the amine in the reaction mixture may vary within wide limits. Low concentrations are, however, advantageous. The concentration of the copper salts is kept low, and is preferably from 0.2 to 2.5 moles per 100 moles of the monomer.

The solvent is usually employed in a ratio of from 1:1 to 20:1, based on the monomer, ie. not more than a 20-fold excess of solvent. Benzene, toluene and aliphatic hydrocarbons, perferably $C_6$–$C_{10}$-hydrocarbons, are used as solvents. The reaction mixture may furthermore contain an activator, such as a diarylguanidine or a diarylformamidine (cf. U.S. Pat. No. 3,544,515).

In the conventional process, the polycondensation reaction is carried out at from 10 to 50° C., perferably from 18 to 30° C., the oxygen being passed into the solution of monomer at from 10 to 50° C., in the presence of the amine complex. The reaction is complete after a short time, ie. the catalyst mixture is metered into the monomer solution in the course of from 0.1 to 1.5 hours while gassing with oxygen or air.

When the desired yield has been attained in the polycondensation, and the polymer has reached the required molecular weight, the reaction solution contains from 1 to 30% by weight of polyphenylene ether, from 0.005 to 1.5% by weight of metal ions and about 0.1–6.0% by weight of the amine and may contain small amounts of other materials. This reaction solution is treated with a complexing agent and/or salt-forming agent in order to remove the metal catalyst present in the polymer. The type of complex-forming extracting agent and the manner in which it is added are not critical. For example, this extracting agent may be added as such, in the form of an aqueous solution or in the form of its alkali metal or alkaline earth metal salts. It may be added all at once or a little at a time, continuously or batchwise, and with or without additional water. The metal component can be separated off in suitable apparatuses, for example in decantation tanks, centrifuges or the like.

The time during which the complexing and salt-forming agent is in contact with the catalyst-containing polyphenylene ether phase can vary within wide limits. Reaction times from 1 minute to 5 hours are preferred, although reaction times from 5 to 60 minutes are frequently sufficient. The preferred reaction temperature is from 25 to 90° C., but temperatures above and below this range may also be employed.

Preferably used complexing and salt-forming agents are compounds selected from the group consisting of the polyalkylpolyamines, polycarboxylic acids, polymeric polycarboxylic acids, aminopolycarboxylic acids, aminocarboxylic acids and aminophosphonic acids. Aminopolycarboxylic acids and their alkali metal and/or alkaline earth metal salts, such as ethylenediaminetetraacetic acid, nitrilotriacetic acid and its mono-, di- and trisodium salts, citric acid, glycine, diglycolic acid, polyacrylic acid, polymaleic acid, aminotri-(methylenephosphonic acid), hydroxyethanediphosphonic acid, hydroxyethyliminodiacetic acid, etc. are particularly preferred.

The complexing and salt-forming agents are used in amounts corresponding to not less than 1 mole of carboxylic acid groups and/or phosphonic acid groups per mole of the metal ion to be removed. In general, from 1.2 to 100 equivalents of carboxylic or phosphonic acid groups are employed per equivalent of heavy metal ion.

The metal catalyst can be removed completely from the polypohenylene ether polymer by repeated addition of the extracting agents followed by separation of the resulting metal complexes and metal salts by the methods described above. In a preferred embodiment of the invention, however, the total amount of catalyst is removed from the polymer in one step.

The amine component of the catalyst system can be either extracted by salt formation with the dilute acid or removed by the distillaion. Particularly suitable acids are dilute sulfurous acid, sulfuric acid and/or acetic acid. This extraction can be carried out before or after stabilization of the polyphenylene ether solutions with reducing agents.

To stabilized the polyphenylene ether solutions against degradation to lower molecular weight compounds, reducing agents can be employed, if necessary in combination with polyhydric phenols. Reduction of the polyphenylene ether solutions with sulfur dioxide, sulfites, dithionites, hydrazine, hydroxylamines and ascorbic acid is particularly advantageous. Aqueous solutions of these reducing agents are generally used. The reducing agents are added in amounts such that there is from 0.1 to 0.5 mole of reducing agent per mole of copper salt of the catalyst. Stabilization is effected at from 25 to 120° C. for residence times of from 1 minute to 2 hours and with thorough mixing.

When the aqueous solution of a reducing agent has been removed, the hydroxyl groups present in the polyphenylene ether chain are converted by the novel process, by adding an epoxide (oxirane) of the general structure (I)

(I)

where $R^1$ and $R^2$ can be identical or different and are each alkyl, cycloalkyl, aryl, aryloxy, alkoxy or carboxyalkyl, each of which may contain a further epoxide group, or $C_3$–$C_{20}$–alkyl-substituted amino, or $R^1$ is hydrogen and $R^2$ is one of the above groups, or $R^1$ and $R^2$ form part of a cycloalkyl ring. The epoxides can be prepared from the olefins by a conventional method, by epoxidation of the double bond with an organic per acid, an inorganic per acid, alkaline hydrogen perioxide, oxygen, ozone or a permanganate, as described by H. Batzer and E. Nikles in *Chimia* 16 (1962), 57–92.

The reaction may be base-catalyzed or acid-catalyzed, and gives different end products. A base-catalyzed blocking reaction is preferred. For this purpose, the base is added to the organic polyphenylene ether solution, and the epoxide (I) is introduced while stirring vigorously. Preferably used bases are trialkylamines and triphenylphosphine. However, the blocking reaction may also be catalyzed by an acid. Sulfuric acid, acetic acid and perchloric acid have proven particularly advantageous in this respect and may also be used in different forms. Uncatalyzed blocking reactions are also possible but result in incomplete conversion and are therefore less preferable.

The epoxides are advantageously used in a 1.1-fold to 30-fold, perferably 1.2-fold to 20-fold, excess, based on the hydroxyl groups present in the polyphenylene ether chain. The excess epoxide is then either washed out with an alcohol with precipitation of the polyphenylene ether or removed by distillation.

The reaction of the epoxide with the polyphenylene ether is advantageously carried out at from 20 to 250° C., preferably from 25 to 150° C. The reaction times for the blocking reaction are from 5 minutes to 2 hours, preferably from 10 to 40 minutes.

Preferred epoxides are glycidyl benzoate, N-glycidyl-N-methylaniline, phenyl glycidyl ether, bisphenol A diglycidyl ether, cyclohexyl epoxide and butane-1,4-diglycidyl ether.

Where phenyl glycidyl ether is used, blocking with base catalysis is most advantageously carried out at elevated temperatures, ie. at from 100 to 250° C. It has proven particularly advantageous to carry out blocking of the polyphenylene ether on an extruder. To do this, the solvent-free and catalyst-free polyphenylene ether is mixed with the phenyl glycidyl ether in the extruder, with the addition of traces of tributylamine or triphenylphosphine.

The residence time is from 1 to 10, preferably from 2 to 5, minutes. If necessary, a mixture of a polyphenylene ether and a styrene polymer may also be used.

After the polyphenylene ether has been blocked by means of an epoxide of the formula (I) is solution, the polyphenylene ether can be isolated from the solution by the methods described in the U.S. patents mentioned at the outset. The isolation of the polyphenylene ether is not critical for the present invention. For example, the polyphenylene ether may be isolated by precipitation from a reaction solution by means of a non-solvent, for example excess alcohol, ie. methanol. The product filtered off can be suspended in alcohol and, if desired, stirred with a decolorizing agent, after which the polyphenylene ether is filtered off, and converted to films, fibers, shaped articles, etc. by conventional methods. Other alcohols, such as isopropanol, propanol or ethanol, can also be used.

A preferred aspect of the present invention is the preparation of the thermally stable polyphenylene ether solutions from which the polymeric substances can be isolated by total isolation methods, for example by spray drying, steam precipitation or crumbling in hot water. This facilitates the commercial use of methods which are more economical than the conventional precipitation processes in terms of the energy required, the solvent losses and the like.

Where the polyphenylene ether is blocked with phenyl glycidyl ether in an extruder, isolation of the polyphenylene ether in a separate state is not required.

The advantages of the invention are as follows: with the aid of the epoxides, complete blocking of the hydroxyl groups present in the polyphenylene ether chains takes place. Phenolic OH functions can no longer be detected by IR spectroscopy during the catalytic conver-sion, although the aliphatic hydroxyl groups (at 3450–3550 cm$^{-1}$) are present since 2-hydroxypropylene groups are formed during the reaction. The reaction can be monitored by means of NMR spectra. Compared with the products obtained by blocking at high temperature, the resulting polyphenylene ethers have the advantage of being virtually colorless. The result of complete blocking of the polyphenylene ethers is increased stability to thermal and/or oxidative influences.

Moreover, the novel base-catalyzed blocking reaction with epoxides makes it possible to obtain polyphenylene ethers which possess terminal β-hydroxypropylenephenoxy groups which are available for further reactions.

The Examples which follow illustrate the invention without restricting it. Parts are by weight, unless stated otherwise.

The intrinsic viscosity is determined by measurement on 0.5% strength solutions in chloroform at 30° C.

The OH functionality is determined by IR spectroscopy, the sprectrum being recorded for dilute (about 1–5% strength) solutions in carbon disulfide in 2 mm thick cells at 15° C., using an FIR spectrometer from Digilab Inc.

The intrinsic color of the polyphenylene ethers was assessed visually:

1 ≙ white 2 ≙ yellow 3 ≙ brown.

EXAMPLE 1

Preparation of poly-(2,5-dimethyl-1,4-phenylene ether)

1.3 g of Cu(I) bromide, 20 g of 1,4-dimethylpentylamine and 2 g of 2,6-dimethylphenol (=DMP) are initially taken and stirred for 5 minutes at 20° C. while oxygen is passed in, after which a solution of 204 g of DMP in 1400 ml of toluene is metered in over 30 minutes and stirring is then continued for a further hour at 20° C. The reaction is carried out in the presence of 30 liters/hour of oxygen.

Purification of the reaction solution

When the reaction is complete, 560 ml of a 10% strength aqueous solution of a copolymer consisting of 72 parts of acrylic acid and 28 parts of maleic anhydride and having a K value of 30, measured on a 1% strength solution in dimethylformamide according to DIN 53,726, are added to the polymer solution, and the mixture is stirred vigorously for 10 minutes at 60° C. Thereafter, when phase separation is complete, the organic phase is separated from the aqueous phase and freed from the amine by washing twice with 100 ml of hydrochloric acid.

Stabilization of the reaction solution

The solution of polyphenylene ether in toluene is stirred vigorously with 30 ml of a 10% strength sodium dithionite solution for 5 minutes at 50° C., after which the aqueous phase is separated off. The polyphenylene ether has the intrinsic viscosity and OH functionality shown in Table 1.

Blocking of the polyphenylene ether 1 ml of tributylamine is added at room temperature to the vigorously stirred solution of the polyphenylene ether in toluene, and 5.2 g of phenyl glycidyl ether are then added. After 15 minutes, the aqueous phase is separated off and the polyphenylene ether is precipitated from the toluene solution by adding methanol, and is dried. The polyphenylene ether has the properties shown in Table 1.

EXAMPLE 2

The polyphenylene ether is prepared as described in Example 1. Removal of the catalyst and stabilization of the polyphenylene ether solution are carried out by the methods described in Example 1 of DT-A-27 54 887. For this purpose, the solution of the polyphenylene ether in toluene is reacted with 15.5 g of a 28% strength aqueous solution of trisodium ethylenediamine tetraacetate, gassed with 10 l of sulfur dioxide for 10 minutes and stirred vigorously for 10 minutes during this procedure. When phase separation is complete, the organic phase and the aqueous phase are separated from one another.

Blocking of the polyphenylene ether

The solution of the polyphenylene ether in toluene is mixed with 15 ml of a 5% strength sodium hydroxide solution with vigorous stirring, after which 5 g of glycidyl benzoate are added at 50° C. After 20 minutes, the organic phase is separated off and the polymer is precipitated by adding methanol and then dried. The properties of the polyphenylene ether are shown in Table 1.

EXAMPLE 3

The preparation of the polyphenylene ether, removal of the catalyst and reduction are carried out as described in Example 2. To block the polyphenylene ether, 2 ml of sulfuric acid are added to the solution of the polyphenylene ether in toluene, and 8 g of phenyl glycidyl ether are introduced. After 60 minutes, the residual phenyl glycidyl ether is removed by distillation, and the polymer is isolated by precipitation with methanol and is dried. The properties of the polyphenylene ether are shown in Table 1.

EXAMPLE 4

The preparation of the polyphenylene ether, removal of the catalyst and reduction are carried out as described in Example 2. Blocking is likewise carried out as described in Example 2, except that bisphenol A diglycidyl ether is used as the bifunctional epoxide. The properties of the polyphenylene ether are shown in Table 1.

COMPARATIVE EXAMPLE A

The preparation of the polyphenylene ether, removal of the catalyst and reduction are carried out as described in Example 2. To block the polyphenylene ether solution, the procedure described in U.S. Pat. No. 3,402,143 (1) is followed. To this end, the polyphenylene ether solution is reacted, at room temperature and while stirring vigorously, with a solution produced from 15 g of lithium and 140 g of benzophenone and 1500 ml of tetrahydrofuran, and 60 ml of acetic anhydride are then added to effect blocking. The polymer is worked up as described in Example 2, and its properties are shown in Table 1.

COMPARATIVE EXAMPLE B

The preparation of the polyphenylene ether, removal of the catalyst and reduction are carried out as described in Example 2, and blocking is effected as described in U.S. Pat. No. 4,048,143 (3). For this purpose, the solution of the polyphenylene ether in toluene is reacted with 30 g of acetic anhydride, 40 g of 75% strength solution of tricaprylmonomethylammonium chloride in isopropanol and 3 g of NaOH for 15 minutes at room temperature, while stirring vigorously. Working up is carried out as described in Example 2, and the properties of the polyphenylene ether are shown in Table 1.

TABLE 1

| | Intrinsic viscosity (dl/g) | | OH groups (%) | | | | Intrinsic color |
|---|---|---|---|---|---|---|---|
| | | | Phenolic OH | | CH$_2$OH | | |
| | before[1] | after[1] | before[1] | after[1] | before[1] | after[1] | |
| Example | | | | | | | |
| 1 | 0.78 | 0.80 | 0.06 | 0 | 0.00/ | 0.05 | 1 |
| 2 | 0.76 | 0.76 | 0.05 | 0 | 0.001 | 0.06 | 1 |
| 3 | 0.76 | 0.76 | 0.08 | 0 | 0.00/ | 0.08 | 1 |
| 4 | 0.78 | 0.94 | 0.08 | 0 | 0.001/ | 0.07 | |
| Comparative example (not according to the invention) | | | | | | | |
| A | 0.76 | 0.72 | 0.08 | 0.03 | 0.001 | 0.001 | 1–2 |
| B | 0.79 | 0.70 | 0.07 | 0.02 | 0.004 | 0.003 | 2 |

[1]Blocking

We claim:

1. An uncrosslinked polyphenylene ether derivative formed by reacting, at a temperature of between 20 and 250° C.,
   (a) a high molecular weight poly(phenylene ether) from a monohydric phenol, which possesses alkyl substituents in the two ortho-positions but not in the para-position and may possess alkyl substituents in the meta-position, and is obtained by an oxidative coupling reaction with oxygen at from 10 to 50° C. in the presence of a catalyst complex of a copper salt and an organic amine, in the presence from 1 to 20 parts by weight of a solvent per part by weight of the monomeric phenol, and in the presence or absence of an activator, and subsequent termination of the reaction and removal of the catalyst component by the addition of sufficient amounts of chelating and/or salt-forming agents, with
   (b) an epoxide of the formula (I)

where $R^1$ and $R^2$ can be identical or different and are each alkyl, cycloalkyl, aryl, aryloxy, alkoxy or carboxyalkyl, each of which may contain a further epoxide group, or $C_3$–$C_{20}$-alkyl-substituted amino, or $R^1$ is hydrogen and $R^2$ is one of the above groups, or $R^1$ and $R^2$ form part of a cycloalkyl ring.

2. A polyphenylene ether derivative as defined in claim 1, wherein, in the epoxide (I), $R^1$ is phenoxy or di-n-butylamino and $R^2$ is H.

3. A polyphenylene ether derivative as defined in claim 1, wherein the reaction is carried out using N-glycidyl-N-methylaniline, glycidyl benzoate, phenyl glycidyl ether, cyclohexyl epoxide, bisphenol A diglycidyl ether or butane-1,4-diglycidyl ether.

4. A polyphenylene ether derivative as claimed in claim 1, wherein the reaction is carried out with a 1.1-fold to 30-fold excess of the epoxide (I), based on the hydroxyl groups of the poly(phenylene ether).

5. A polyphenylene ether derivative as claimed in claim 1, wherein the reaction is carried out in the catalyst-free reaction solution.

6. A polyphenylene ether derivative as claimed in claim 1, wherein the reaction is carried out in an alkaline medium.

7. A polyphenylene ether derivative as claimed in claim 1, wherein the reaction is carried out in an acidic medium.

8. A polyphenylene ether derivative as claimed in claim 1, wherein the reaction is carried out in the presence of tributylamine or triphenylphosphine.

* * * * *